(12) United States Patent
Thompson et al.

(10) Patent No.: US 6,489,998 B1
(45) Date of Patent: Dec. 3, 2002

(54) METHOD AND APPARATUS FOR DEINTERLACING DIGITAL VIDEO IMAGES

(75) Inventors: Laurence A. Thompson, Saratoga, CA (US); Dale R. Adams, San Jose, CA (US)

(73) Assignee: DVDO, Inc., Campbell, CA (US)

( * ) Notice: Subject to any disclaimer, the term of this patent is extended or adjusted under 35 U.S.C. 154(b) by 0 days.

(21) Appl. No.: 09/372,713

(22) Filed: Aug. 11, 1999

Related U.S. Application Data

(60) Provisional application No. 60/096,144, filed on Aug. 11, 1998.

(51) Int. Cl.$^7$ .................................................. H04N 11/00

(52) U.S. Cl. ........................................ 348/452; 348/448

(58) Field of Search ................................ 348/452, 448, 348/441, 458, 556, 558, 700

(56) References Cited

U.S. PATENT DOCUMENTS

| | | | | |
|---|---|---|---|---|
| 5,291,275 A | * | 3/1994 | Lumelsky | 348/441 |
| 5,784,115 A | * | 7/1998 | Bozdagi | 348/452 |
| 5,844,627 A | * | 12/1998 | May et al. | 348/607 |
| 6,055,018 A | * | 4/2000 | Swan | 348/448 |
| 6,104,755 A | * | 8/2000 | Ohara | 375/240 |

\* cited by examiner

Primary Examiner—Victor R. Kostak
(74) Attorney, Agent, or Firm—Perkins Coie LLP

(57) ABSTRACT

A digital image processor is provided. The digital image processor includes a deinterlacing processor that is implemented upon a digital processing unit. The deinterlacing processor is coupled to an input operable to receive an interlaced video stream, a digital memory for storing portions of the interlaced video signal, and an output operable to transmit a deinterlaced video stream. The deinterlacing processor is operable to perform frequency analysis upon the received interlaced video stream in order to generate the deinterlaced video stream having reduced motion artifacts.

4 Claims, 9 Drawing Sheets

METHOD AND APPARATUS FOR DEINTERLACING DIGITAL VIDEO IMAGES

CROSS REFERENCE TO RELATED APPLICATIONS

This application claims the benefits of co-pending U.S. Patent Provisional Application No. 60/096,144 filed on Aug. 11, 1998, and is related to U.S. patent application Ser. No. 09/167,527 filed on Oct. 6, 1998, both of which are incorporated herein by reference.

BACKGROUND OF THE INVENTION

1. Field of the Invention

The present invention relates generally to the processing of video images and, more particularly, to techniques for deinterlacing video images.

2. Description of the Related Art

All major television standards use a raster scanning technique known as "interlacing" or "interlace scanning." Interlace scanning draws horizontal scan lines from the top of the screen to the bottom of the screen in two passes. Each pass is known as a field. In the National Television System Committee (NTSC) standard used in North America, each field takes approximately $\frac{1}{60}^{th}$ of a second to draw.

Interlace scanning depends of the ability of the cathode ray tube (CRT) phosphors to retain an image for a few milliseconds, in effect acting like a "memory" to retain the previous field while the newer interleaved field is being scanned. Interlace scanning provides a benefit in television systems by doubling the vertical resolution of the system without increasing broadcast bandwidth.

FIG. 1 shows a number of parallel horizontal scan lines 10 on a conventional television display. A first set of horizontal lines 12 is scanned in a first field period and then a second set of horizontal lines 14 is scanned in a second field period. Thus, the first field is temporarily shifted by $\frac{1}{60}^{th}$ of a second from the second field. When rapidly changing images are being displayed, an object in motion may appear to be fuzzy due to the temporal displacement between the two fields.

This temporal displacement typically does not create a problem on conventional television displays, primarily because the image of the "older" field quickly fades in intensity as the light output of the phosphors decays. A secondary reason is that the spatial displacement in the images caused by motion results in a fine detail that television displays resolve well. For these reasons, interlace scanning of motion pictures works acceptably well on conventional television displays.

FIG. 2 shows a set of progressively scanned horizontal lines 16. In progressive scanning, all horizontal lines 16, are scanned out in one vertical pass 18, so there is no time displacement of adjacent lines as in interlace scan. Progressive scanning requires a much higher bandwidth signal. Consequently, progressive scanning is typically used for applications where improved image quality and higher resolution are required, relative to conventional television systems. Progressive scanning is widely used in computer CRTs and liquid crystal displays (LCD).

If a motion picture formatted for an interlaced monitor device as in FIG. 1 is to be displayed on a progressively scanned device as in FIG. 2, then it must be converted from the interlaced format to the progressive format. This format conversion is known as deinterlacing. FIG. 3 is a flow diagram of a deinterlace process 19 of the prior art. A first series of interlaced video fields 20 is generated by a video source (not illustrated) at $\frac{1}{60}^{th}$ second intervals. In this example, each of the video fields 20 has a spatial resolution of 720 horizontal by 240 vertical pixels. Each field contains half the vertical resolution of a complete video image. The first series of video fields 20 are input to a deinterlace processor 22, which converts the 720 by 240 interlaced format to a second series of video fields 24. In this example, each of the second series of video fields 24 may have 720 by 480 pixels where the fields are displayed at 60 frames per second.

FIG. 4 shows a prior art method 25 of deinterlace processing. A video field 26 containing scan lines 30, and a previous video field 28 containing scan lines 32 is fed into a field combination deinterlace processor 34. The result is a combined frame 36 with scan lines 38 sourced from video field 26 and scan lines 40 sourced from video field 28. When this simple deinterlacing of the prior art is performed, and a motion picture formatted for an interlace display is converted to a progressive format, a noticeable "artifact" or error arises because the image content of vertically adjacent lines is time shifted by $\frac{1}{60}^{th}$ second as noted previously. The error is most visible around the edges of objects that are in motion.

FIG. 5 shows a deinterlaced image 42 with a stationary object 43 that is rendered without distortion. FIG. 6 shows an image 44 with the object 43' in motion. The edges of object 43' create artifacts 45 on the edges of the image 44 because of the aforementioned temporal shift. These artifacts 45 are introduced into the image by the conventional field combination deinterlacing method 25 of FIG. 4.

FIG. 7 is an illustration of an alternative prior art method 46 to deinterlace an image using a single reference field rather than two fields. The method 46 interpolates or doubles the number of lines of one field to produce a progressive frame. A video field 48 is scanned from an image to contain a half set of lines 50. The half set of lines 50 is deinterlaced by line interpolation in a deinterlacing interpolator 52.

The resulting frame 54 will have all the lines 50 of the original video field 48. The remaining lines 56 are created by interpolation of lines 50. The resultant image will not have motion artifacts because all the lines in the image will be created from lines 50 that are time correlated. This alternative method 46 of deinterlacing does not produce motion artifacts, but the vertical resolution of the image is reduced by half.

In summary, deinterlacing by combining two fields into a single frame preserves the vertical resolution in an image, but may result in motion artifacts. Deinterlacing by interpolation of a single field to produce a frame eliminates the motion artifacts, but discards half the vertical resolution of the original image. In view of the forgoing, it is desirable to have a method of deinterlacing that provides for preservation of the full resolution of an image, while at the same time eliminating motion artifacts.

SUMMARY OF THE INVENTION

The present invention fills these needs by providing a method and apparatus for deinterlacing a video input stream while reducing motion artifacts and maintaining vertical resolution in the deinterlaced video stream. It should be appreciated that the present invention can be implemented in numerous ways, including as a process, an apparatus, a system, a device or a method. Several inventive embodiments of the present invention are described below.

In one embodiment of the present invention, a digital image processor is provided. The digital image processor includes a deinterlacing processor that is implemented upon a digital processing unit. The deinterlacing processor is coupled to an input operable to receive an interlaced video stream, a digital memory for storing portions of the interlaced video signal, and an output operable to transmit a deinterlaced video stream. The deinterlacing processor is operable to perform frequency analysis upon the received interlaced video stream in order to generate the deinterlaced video stream having reduced motion artifacts.

In another embodiment of the present invention, a method for deinterlacing an interlaced video stream is provided. The method includes receiving a video frame including a number of pixels from an input of the interlaced video stream. The video frame is analyzed for frequency information inherent to the video frame in order to detect motion artifacts. A number of motion artifact detection values is determined for each of the pixels in the video frame. An ultimate detection value is then determined for each motion artifact detection values. The ultimate detection value corresponding to each pixel is mixed with a set of spatially corresponding pixels to generate an output pixel.

In yet another embodiment of the present invention, a method for deinterlacing an interlaced video stream is provided. The method includes receiving a first video frame including a number of pixels from an input of the interlaced video stream. The first video frame is analyzed for frequency information inherent to the first video frame in order to detect motion artifacts. A number of motion artifact detection values is determined for each of the pixels in the first video frame from which. An ultimate detection value is then determined for each motion artifact detection value. A second video frame, which includes pixels that spatially correspond to pixels of the first video frame, is determined from the input of the interlaced video stream. The ultimate detection value corresponding to each pixel is then mixed with a set of spatially corresponding pixels in the second video frame to generate an output pixel.

An advantage of the present invention is that it allows for detection and reduction of motion artifacts in video images. By reducing the effect of the motion artifact, the video image becomes much clearer and appears to be free of defects. Further, the deinterlacing is accomplished without loss of vertical resolution.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings. To facilitate this description, like reference numerals designate like structural elements.

DETAILED DESCRIPTION OF THE PREFERRED EMBODIMENTS

A method and apparatus for a video deinterlace processing is disclosed. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

Figure 1:
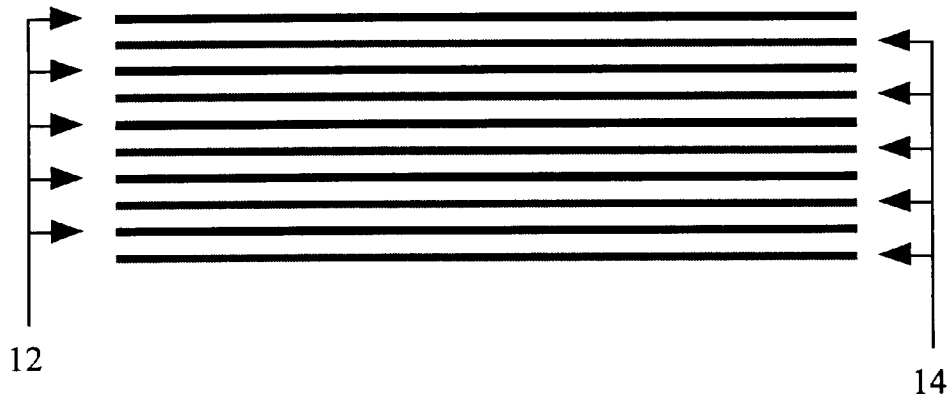
FIG. 1 shows a number of parallel horizontal scan lines on a conventional television display.
Figure 2:
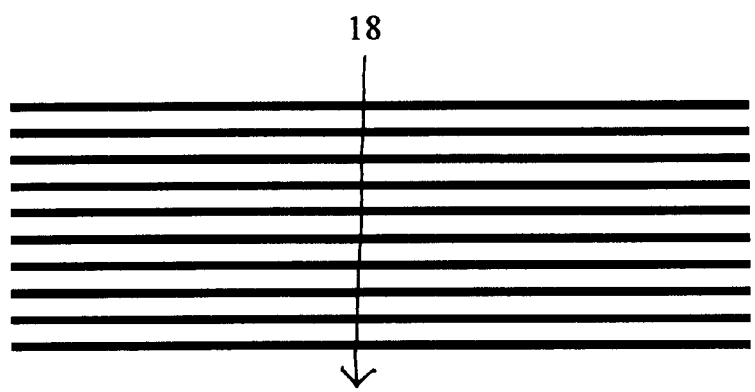
FIG. 2 shows a set of progressively scanned horizontal lines in a prior art progressive scan display.
Figure 3:
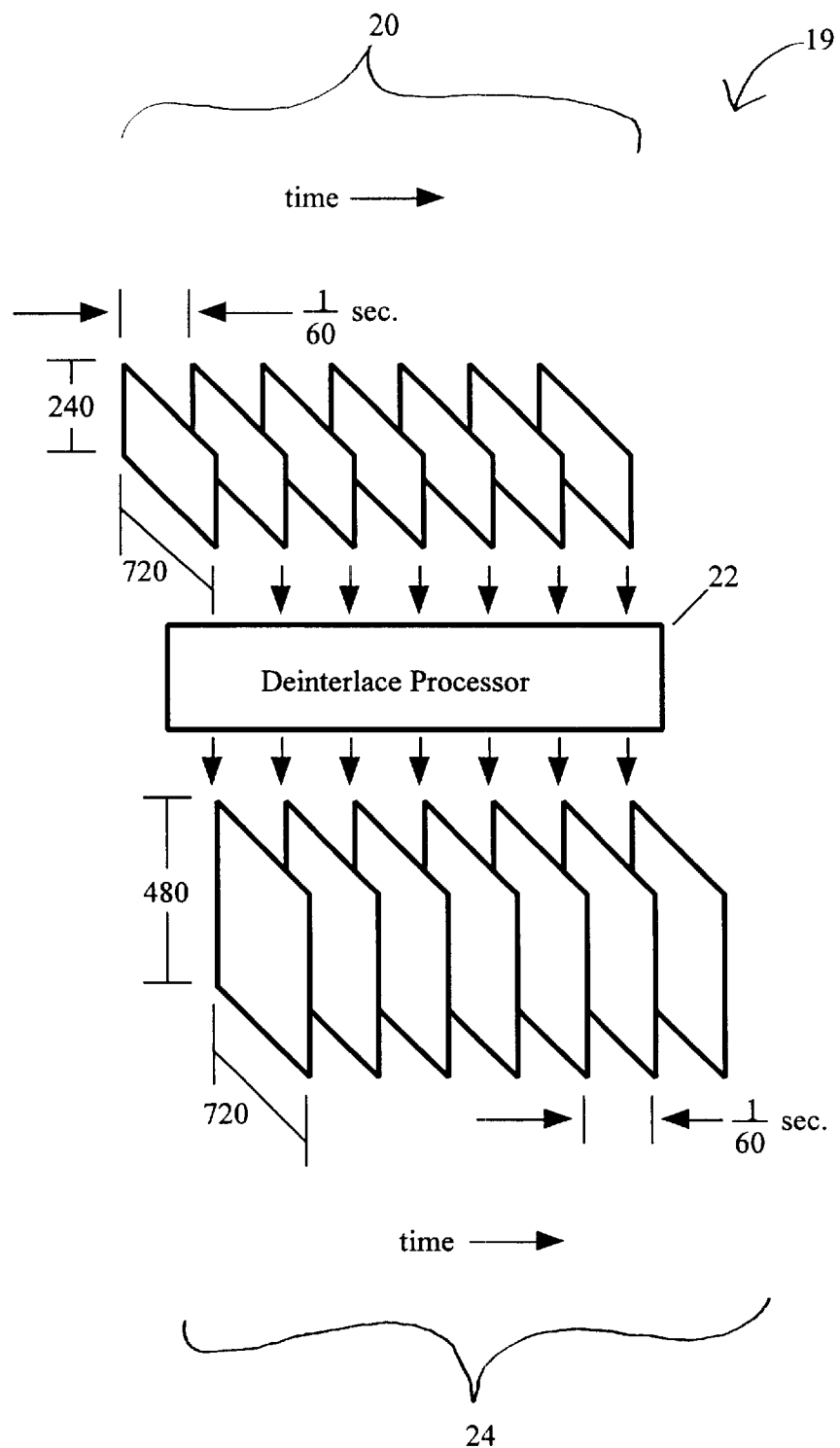
FIG. 3 is an illustration of a deinterlace process of the prior art.
Figure 4:
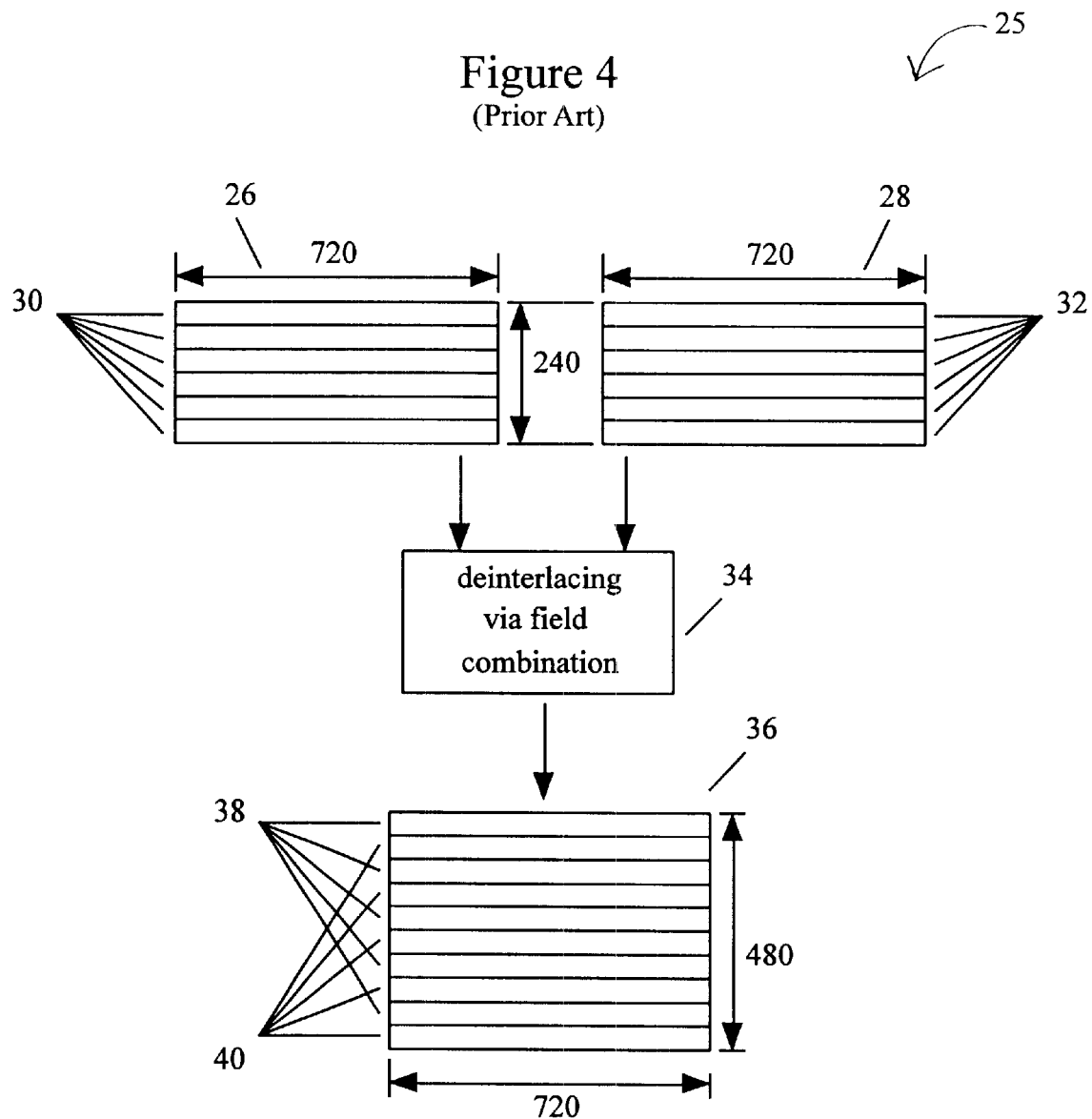
FIG. 4 is a further illustration of deinterlace processing of the prior art.
Figure 5:
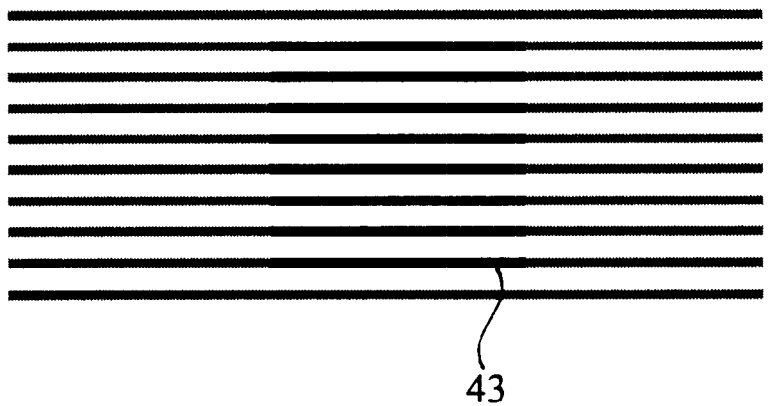
FIG. 5 shows a deinterlaced image of the prior art with a stationary object.
Figure 6:
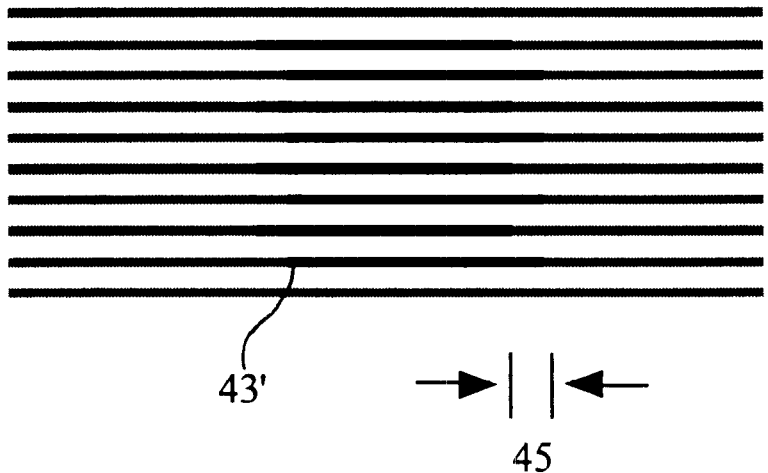
FIG. 6 shows a deinterlaced image of the prior art with an object in motion, creating undesirable "artifacts."
Figure 7:
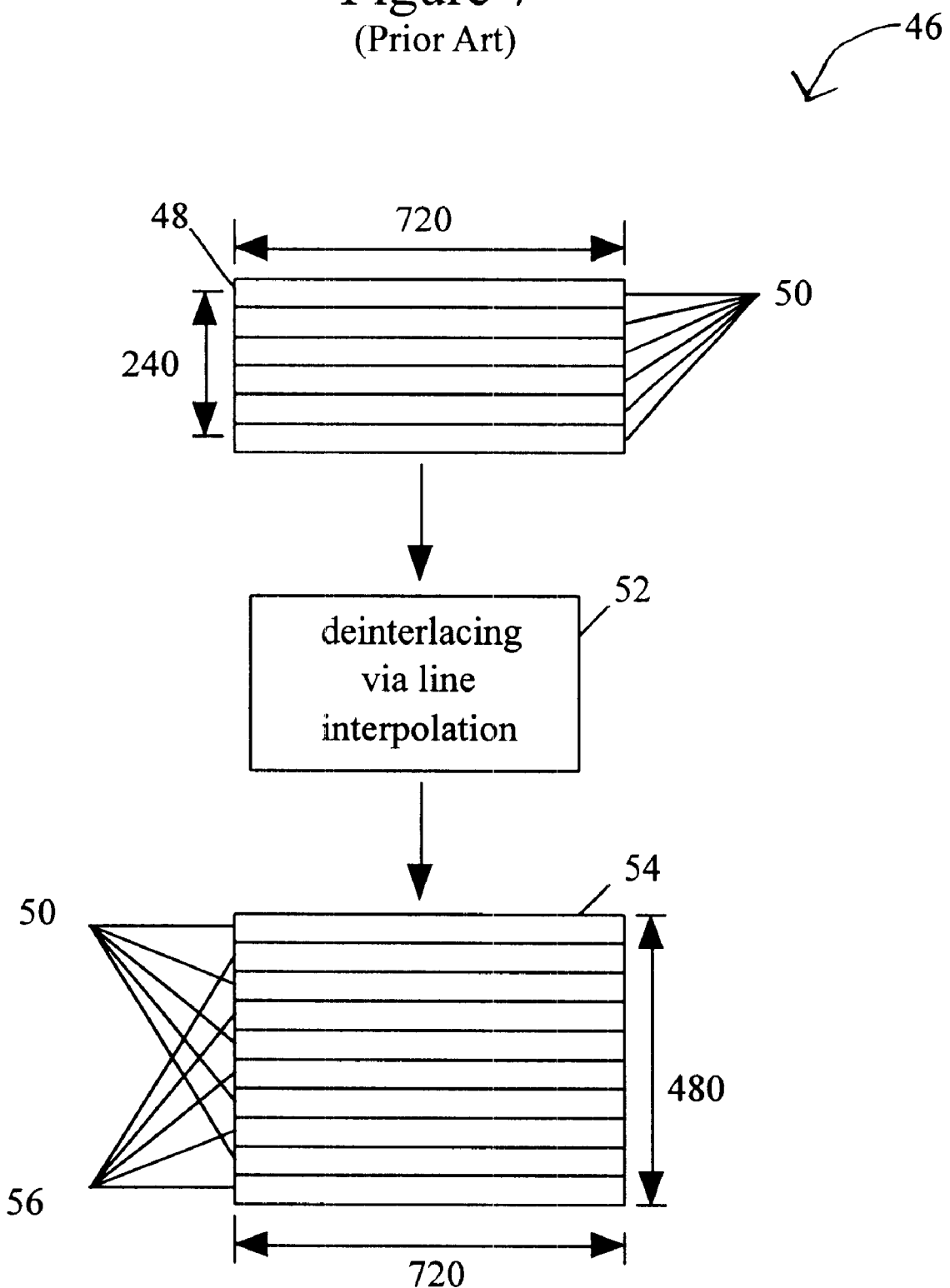
FIG. 7 is a flow diagram of an alternative prior art method to deinterlace an image using a single reference field.

FIGS. 1–7 were discussed with reference to the prior art. FIG. 4 illustrated the combination of two temporally shifted fields that are adjacent in time, which are combined to create a frame that has double the vertical resolution of each field. For example, if the fields have a resolution of 720 horizontal pixels by 240 vertical pixels, then the combined frame has a resolution of 720 horizontal pixels by 480 vertical pixels. This combined frame will have the full vertical resolution available from the source, but is also prone to having motion artifacts.

Figure 8:
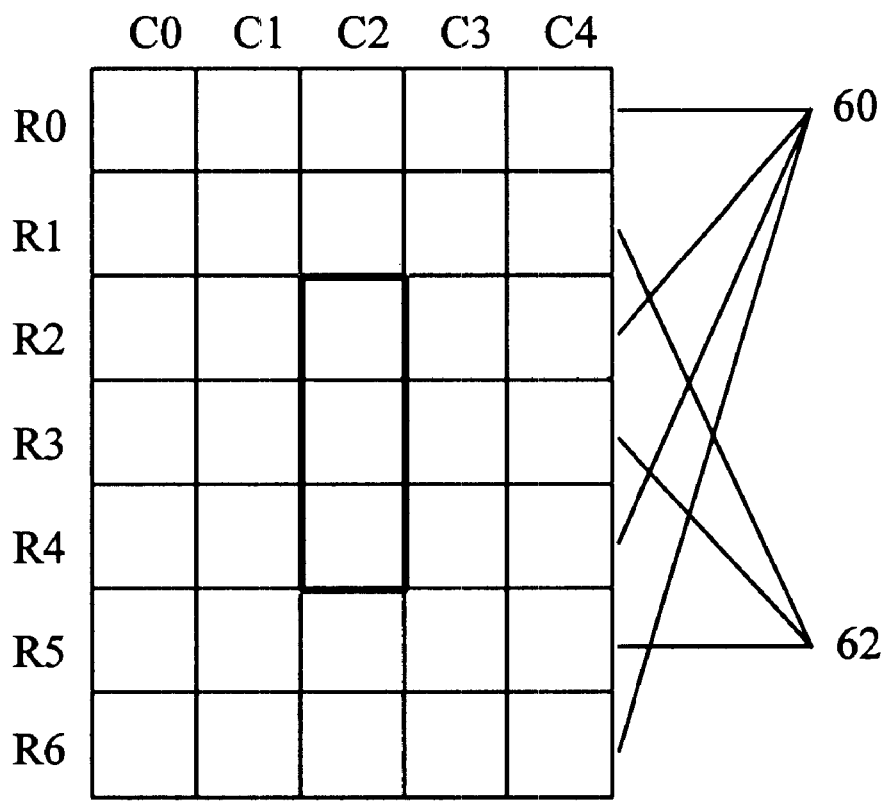
FIG. 8 shows a two-dimensional array of pixel values used to describe the present invention.
Figure 8:
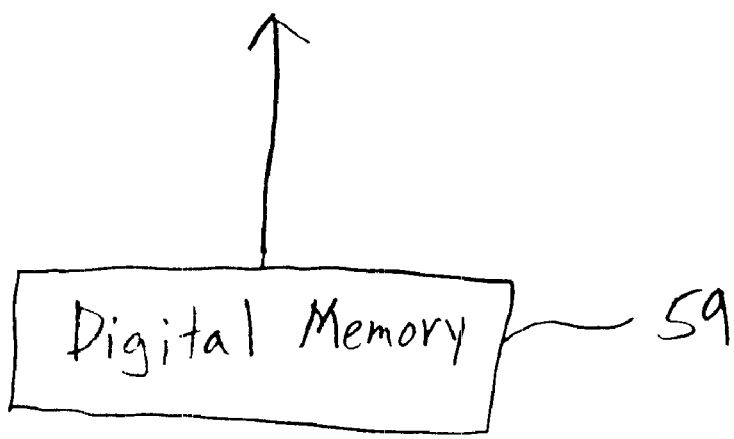

FIG. 8 shows a two-dimensional array of pixel values 58 that is a subset of the combined frame 36 of FIG. 4. The combined frame 36 may be stored in a digital memory unit 59. Digital memory unit 59 is used to store portions of the interlaced video stream, and is particularly useful for storing temporally adjacent video fields in the present invention. The array 58 is shown having a width of 5 pixels and a height of 7 pixels. The array 58 is labeled across the top C0 to C4 indicating columns and is labeled vertically along the left side from the top to bottom R0 to R6 indicating rows. The array 58 can be viewed as a moving window that scans across the combined frame 36 from left to right and top to bottom.

The array 58 is positioned so that a set of even numbered rows 60 contain pixels from the most recent or "current" field of the original source, and a set of odd numbered rows 62 contain pixels from the previous field. The array 58 is then stepped across the combined frame 36 from left to right horizontally. Each step causes the pixels in each of columns C1, C2, and C3 and C4 to shift to the column to its immediate left. The pixels in column C0 shift out of the array 58, and a new column of pixels shifts into column C4.

After the array 58 has been stepped across all the horizontal positions, it is stepped down vertically by two pixtels and returned to the left side of the field. Therefore, even numbered rows 60 contains pixels from the most recent field and odd numbered lines 62 contain pixels from the previous field. The process then repeats itself as array 58 is then stepped across the combined frame 36 again from left to right horizontally.

Figure 9:
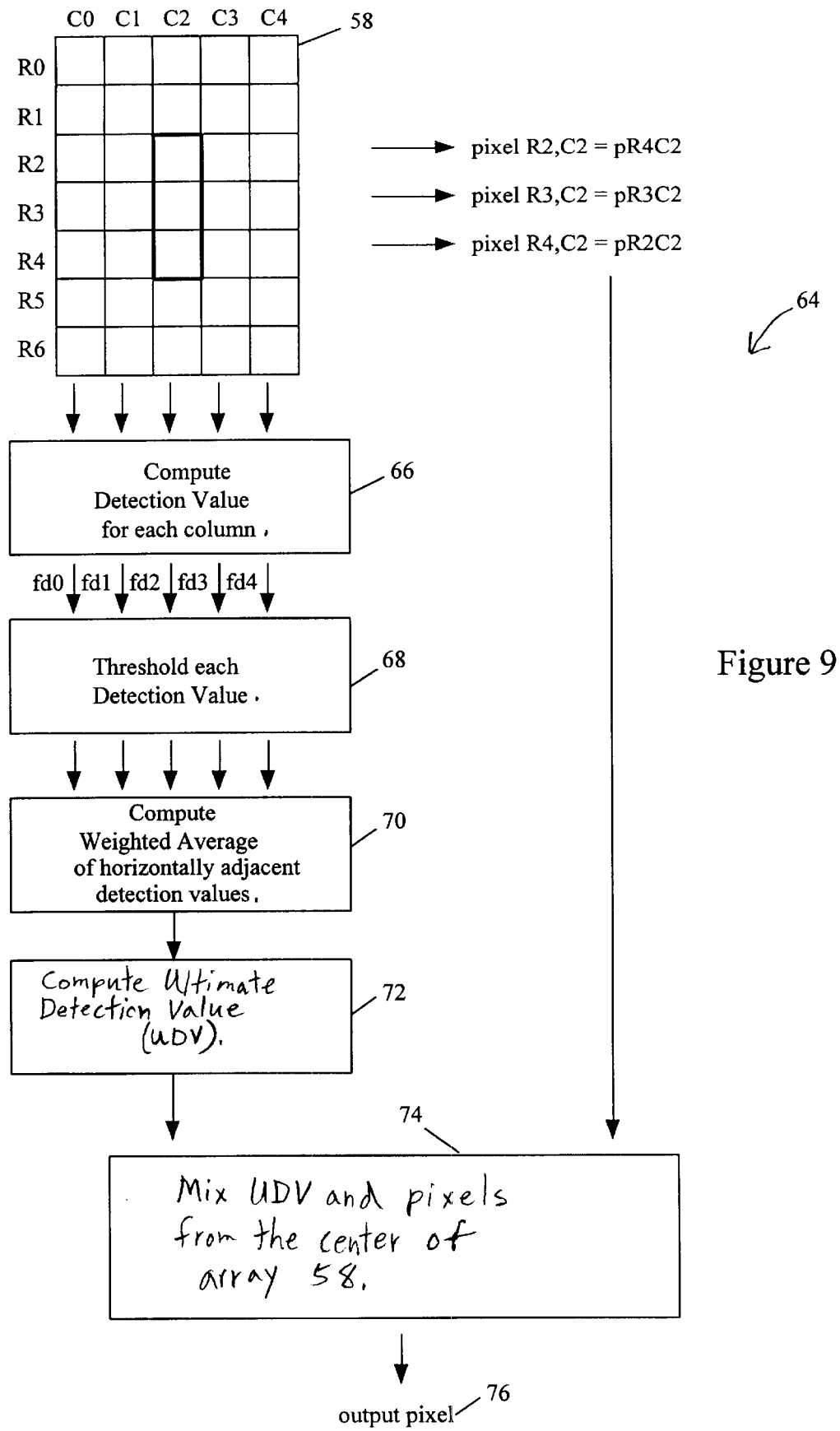
FIG. 9 is a diagram illustrating a method for using obtaining an output pixel from the two-dimensional array of FIG. 8 in accordance with the present invention.

FIG. 9 illustrates a method 64 for using obtaining an output pixel 76 from the two-dimensional array 58. In an act 66, a frequency detection value is obtained using the seven pixels of each column of the two-dimensional array 58. The magnitude of a frequency detection value corresponds to the energy or intensity of the detected motion artifact in a specific pixel. Because there are five columns, there are five frequency detections performed, producing a set of detection values fd0, fd1, fd2, fd3, and fd4. Next, an act 68 thresholds the set of detection values fd0–fd4. Then, in act 70, the set of detection values fd0–fd4 is combined to compute a weighted average.

The weighted average is then used in an act 72 to compute an ultimate detection value (UDV). The weighting factors may include variables. One weighting example is in the following Equation 1:

$$UDV=(fd0+(2*fd1)+(8*fd2)+(2*fd3)+fd4)/14$$

The weighting causes frequency detection values closest to the center of array 58 to have the greatest influence on UDV. In this way, using five horizontally adjacent frequency detection values results in a low pass filtering act providing smoother transitions between areas within the image 36 where motion artifacts do and do not exist.

UDV computed in act 72 is used to control an act 74, which mixes a pixel with spatially corresponding pixels from the center of array 58 to generate an output pixel. Act 74 preferably implements the following Equation 2:

$$pixelout=(UDV*(pR2C2+pR4C2)/2)+((1-UDV)*pR3C2)$$

where pixelout is the new the output pixel of the deinterlacing act at position pR2C2 is a pixel in the array 58 at location Row 2, Column 2, pR4C2 is a pixel in the array 58 at location Row 4, Column 2, and pR3C2 is a pixel in the array 58 at location Row 3, Column 2.

The result of mixing act 74 is that the new value of pixel pR3C2 of the array 58 depends on UDV. If no motion is detected by the calculation of UDV, then the pixel at pR3C2 will be the unmodified value of the pixel at that position in the previous field. If a large UDV, i.e., a value of 1 results, then a strong motion artifact has been detected, and the value of pR3C2 is computed by averaging the values of pR2C3 and pR4C3 of the array 58. The averaged result will not show motion artifacts because is created from values of the most recent field that are time correlated with the most recent field. Detection values that are between 0 and 1 will cause the pixel at pR3C2 to be a mix of pR3C2 and the average of pR2C3 and pR4C3.

Figure 10A:
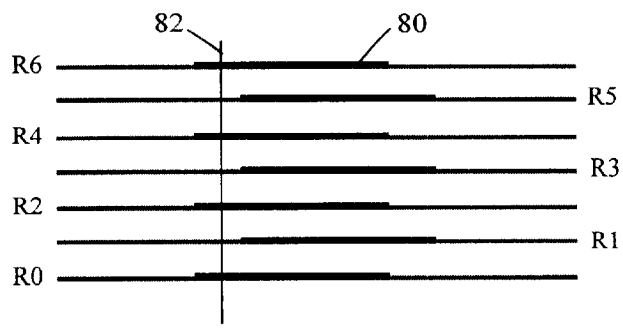
FIG. 10A is an illustration used to describe the method of the present invention.

FIG. 10A illustrates an image 78 showing act 66 in greater detail. Image 78 shows the computation of a single frequency detection value for one column of array 58. Image 78 includes a distorted object 80 which is effected by an interlace motion artifact. Image 78 is sampled along a line 82, which is shown for exemplary purposes. This sampling corresponds to one of the columns in two-dimensional array 58. In this example, line 82 passes through an area where artifacts exist, but in general, a sampling of vertical adjacent pixels may or may not contain artifacts.

Figure 10B:
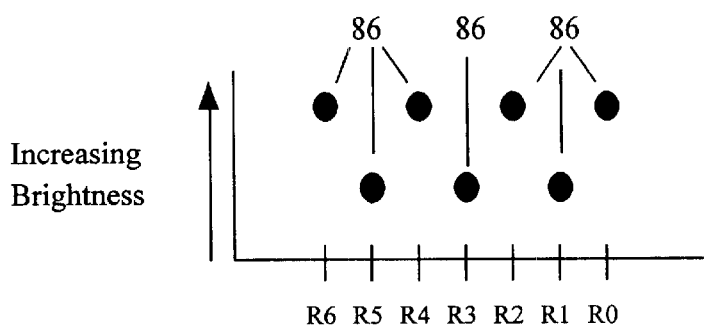
FIG. 10B is a graph of a set of samples from the sampling line of FIG. 10A.

FIG. 10B is a graph 84 of a set of samples 86 obtained by sampling along line 82 of FIG. 10A. The set of samples 86 are plotted with the row numbers along the horizontal axis and the brightness or intensity of the pixel along the vertical axis. From graph 84, it is apparent that in the areas where motion artifacts exist, such as the set of samples 86, will show a characteristic frequency. This is frequency in space rather than in time and is most conveniently expressed as cycles per line rather than cycles per second or Hertz. The characteristic frequency is 1 cycle 2 lines or 0.5 cycles/line.

Figure 10C:
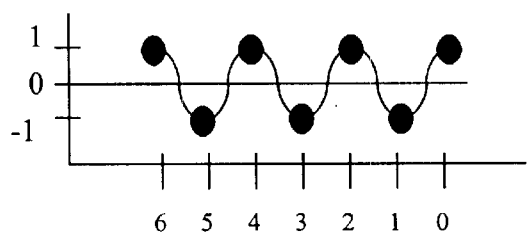
FIG. 10C is a graph of a sampled cosine wave.

FIG. 10C is a graph of a sampled cosine wave 88. The characteristic frequency created by the motion artifact is detected by multiplying the set of samples 86 by the sampled cosine wave 88. The sampled cosine wave 88 has a frequency equal to the characteristic frequency of the motion artifact. Then, the result is integrated using the following equation:

$$fd = \sum_{R=0}^{R=6} Y(R)\cos(2R\pi * 0.5 \text{ cycles/line})$$

where fd is the frequency detection value for one column of array 58, R is a line index corresponding to the R0 . . . R6 of array 58 and has the units "line," and Y(R) is the set of vertically adjacent samples 86.

The expression cos (2πR*0.5 cycles/line) simplifies to 1 for R=0, 2, 4, and 6 and −1 for R=1, 3, and 5. If 1 and −1 are substituted for R0 . . . R6, the frequency detection equation becomes: fd=(Y6/2+Y4+Y2+Y0/2)−(Y5+Y3+Y1). Note that Y6 and Y0 are divided by 2 because the integration is over the limits 0 to 6. The final fd is the absolute value: fd=Abs(fd). The method 64 of FIG. 9 is repeated for each column in array 58, producing the set of frequency detection values 68.

Figure 11:
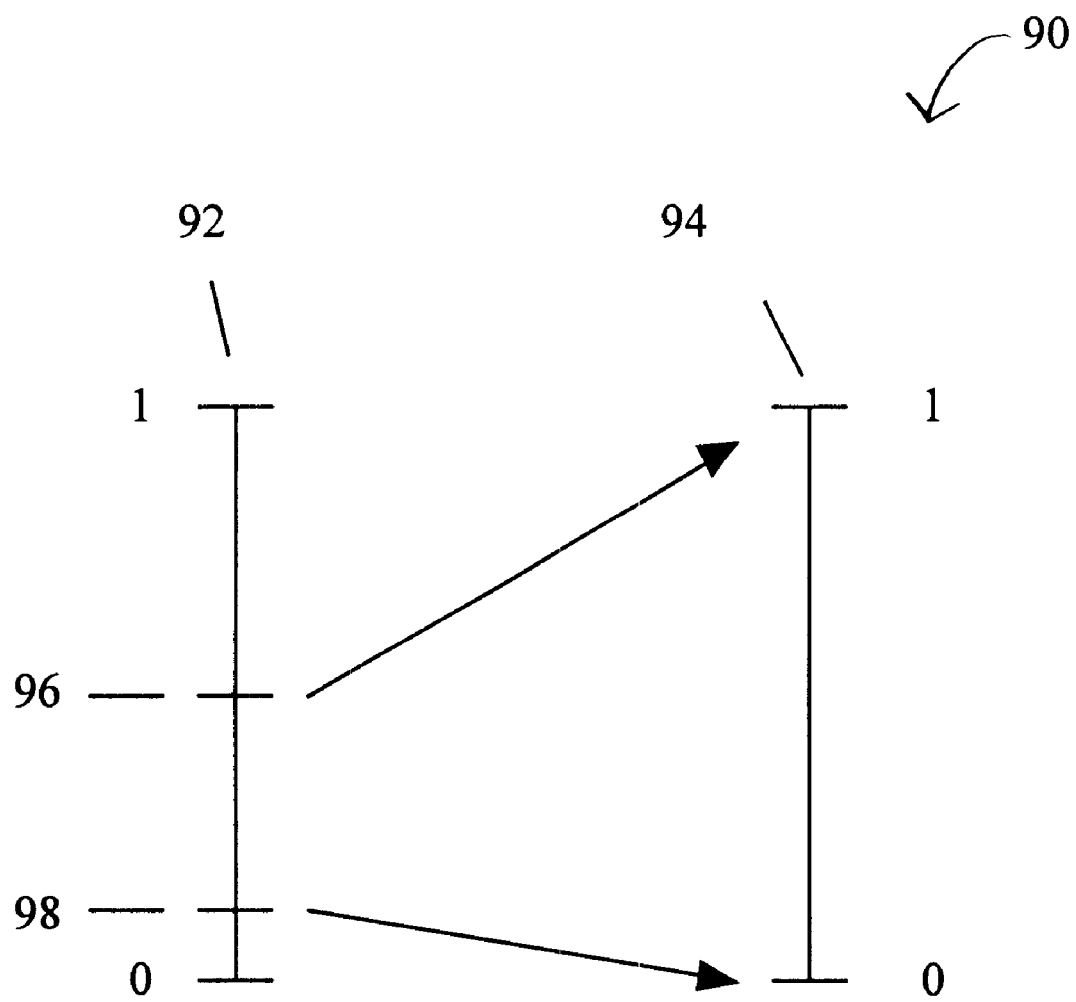
FIG. 11 is an illustration used to describe the method of thresholding a detection value of the present invention.

FIG. 11 is a graph 90 of thresholding act 68 in greater detail. Each fd is a number in the range 0 to 1. Graph 90 includes a non-thresholded scale 92 from which values are thresholded to the thresholded scale 94. Thresholding sets all values above the upper threshold point 96 to the value of 1. All values below the lower threshold point 98 are set to a value of 0. Values between the upper and lower thresholds are expanded to the range 0 to 1. Thresholding can be described with the following equation:

$$tdf=(ptfd-LTH)/UTH$$

where tdf is the thresholded frequency detection value, pthfd is the pre-thresholded frequency detection value (the output of act 66), LTH is the lower threshold value and UTH is the upper threshold value. If tfd>1.0, then tfd=1.0. Otherwise, if tfd<0 then tfd=0.

While this invention has been described in terms of several preferred embodiments, it will be appreciated that those skilled in the art upon reading the preceding specifications and studying the drawings will realize various alterations, additions, permutations and equivalents thereof. It is therefore intended that the present invention include all such alterations, additions, permutations, and equivalents as fall within the true spirit and scope of the invention.

It will therefore be appreciated that the present invention provides a method and apparatus for deinterlacing an interlaced video stream while maintaining the original resolution of the video stream while reducing edge artifacts in moving objects in an output video image. This is accomplished by employing two-field interlacing where the image is relatively static, and employing one-field line doubling where the image is rapidly changing. The combination of these techniques provides a low-artifact, high-resolution deinterlaced image.

Other embodiments of the invention will be apparent to those skilled in the art from consideration of the specification and practice of the invention. Furthermore, certain terminology has been used for the purposes of descriptive clarity, and not to limit the present invention. The embodiments and preferred features described above should be considered exemplary, with the invention being defined by the appended claims.

What is claimed is:

1. A method for deinterlacing an interlaced video stream comprising:

receiving a video frame including a plurality of pixels from an input of said interlaced video stream;

analyzing frequency information inherent to said video frame in order to detect motion artifacts in said video frame;

determining a plurality of motion artifact detection values, there being one detection value for each of said plurality of pixels in said video frame;

determining an ultimate detection value for each of said plurality of motion artifact detection values, wherein determining the ultimate detection value includes multiplying a number of vertically adjacent pixels of the video frame by a predetermined digital signal, generating a number of multiplied results, summing the multiplied results to generate a partial detection value for each column of the video frame and then determining the average of the partial detection values for each column of the video frame resulting in the ultimate detection value;

the predetermined digital signal has a spatial frequency of 0.5 cycles/line and a number of elements equal to the number of pixels analyzed; and for each of said plurality of pixels, mixing each of said plurality of pixels with a set of spatially corresponding pixels, while using the ultimate detection value as a control, to generate an output pixel.

2. A method for deinterlacing an interlaced video stream comprising:

receiving a first video frame including a plurality of pixels from an input of said interlaced video stream;

analyzing frequency information inherent to said first video frame in order to detect motion artifacts in said first video frame;

determining a plurality of motion artifact detection values, there being one detection value for each of said plurality of pixels in said first video frame;

determining an ultimate detection value for each of said plurality of motion artifact detection values, wherein determining the ultimate detection value includes multiplying a number of vertically adjacent pixels of the video frame by a predetermined digital signal, generating a number of multiplied results and then summing the multiplied results to generate a partial detection value for each column of the video frame and then determining the average of the partial detection values for each column of the video frame resulting in the ultimate detection value;

the predetermined digital signal has a spatial frequency of 0.5 cycles/line and a number of elements equal to the number of pixels analyzed;

determining a second video frame from said input of said interlaced video stream, said second video frame including pixels that spatially correspond to pixels of said first video frame; and for each of said plurality of pixels, mixing each of said plurality of pixels with a set of spatially corresponding pixels in said second video frame, while using the ultimate detection value as a control, to generate an output pixel.

3. A method for deinterlacing an interlaced video stream as recited in claim 1, wherein determining the average of the partial detection values includes multiplying each partial detection value by a weighting factor.

4. A method for deinterlacing an interlaced video stream as recited in claim 2, wherein determining the average of the partial detection values includes multiplying each partial detection value by a weighting factor.

* * * * *